United States Patent [19]
Sano et al.

[11] Patent Number: 5,263,686
[45] Date of Patent: Nov. 23, 1993

[54] METHOD AND APPARATUS FOR LAYING AND COLLECTING A WIRE

[75] Inventors: Hiroaki Sano, Kanagawa; Kuni Hayashi, Tokyo; Yoshiaki Terasawa; Shigeru Tanaka, both of Kanagawa, all of Japan

[73] Assignee: Sumitomo Electric Industries, Ltd., Osaka, Japan

[21] Appl. No.: 944,307

[22] Filed: Sep. 14, 1992

Related U.S. Application Data

[62] Division of Ser. No. 563,757, Aug. 7, 1990, Pat. No. 5,163,657.

[30] Foreign Application Priority Data

Aug. 7, 1989 [JP] Japan .................................. 1-204227
Mar. 22, 1990 [JP] Japan .................................. 2-72723

[51] Int. Cl.⁵ ............................................. B65H 59/00
[52] U.S. Cl. ........................ 254/134.4; 254/134.3 FT
[58] Field of Search ............. 254/1, 134.3 R, 134.3 FT, 254/134.4

[56] References Cited

U.S. PATENT DOCUMENTS

| | | | |
|---|---|---|---|
| 3,809,366 | 5/1974 | Crees | 254/134.3 FT |
| 4,197,628 | 4/1980 | Conti et al. | 29/426.5 |
| 4,565,351 | 1/1986 | Conti et al. | 254/134.3 FT |
| 4,756,510 | 7/1988 | Klamm et al. | 254/134.4 |
| 4,783,054 | 11/1988 | Morel et al. | 254/134.4 |
| 5,022,634 | 7/1991 | Keeble | 254/134.4 |

Primary Examiner—Bruce M. Kisliuk
Assistant Examiner—Eileen P. Morgan
Attorney, Agent, or Firm—Cushman, Darby & Cushman

[57] ABSTRACT

A wire laying apparatus comprising a first carrier member, a second carrier member having one end connected to the first carrier member, a communication wire disposed within the second carrier member, and a compressor connected to and supplying a fluid under pressure to a second end of the second carrier member through which the fluid supplied by the compressor serves to move the communication wire from the second carrier member to the first carrier member. The wire laying apparatus may be restructured to serve as a wire collecting apparatus.

4 Claims, 5 Drawing Sheets

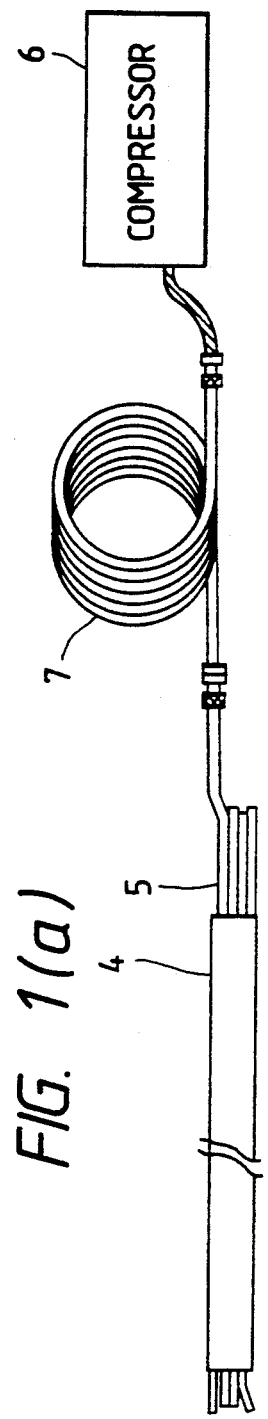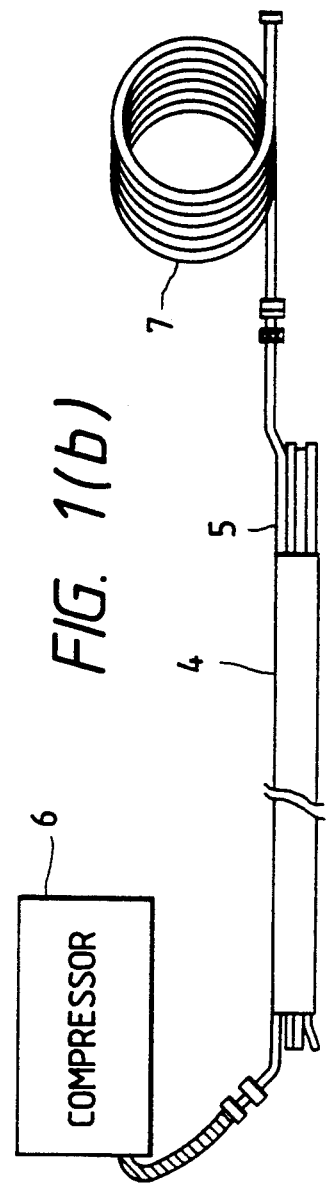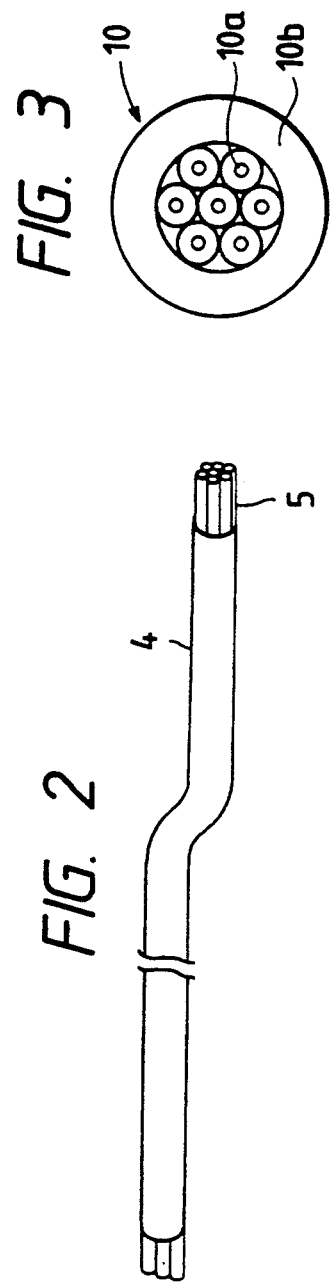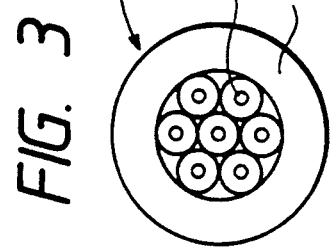

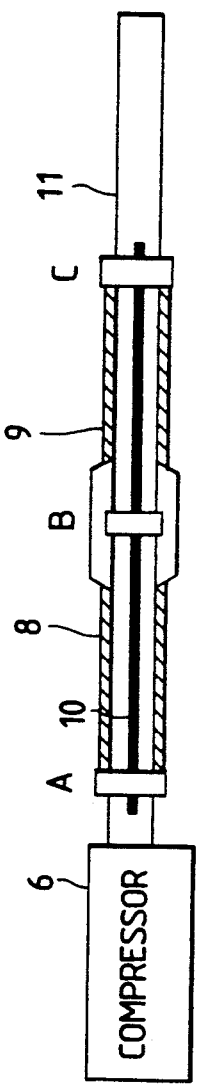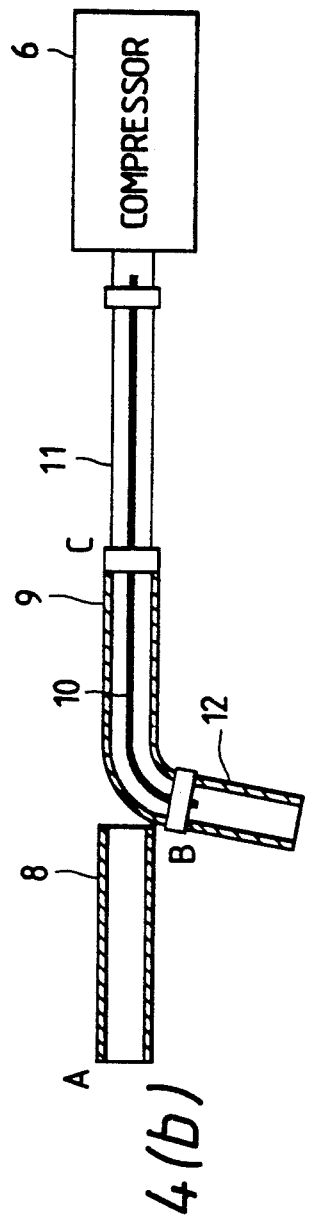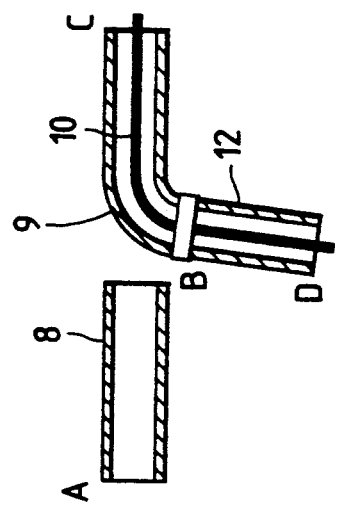
FIG. 4(a)
FIG. 4(b)
FIG. 4(c)

METHOD AND APPARATUS FOR LAYING AND COLLECTING A WIRE

This is a division of application Ser. No. 07/563,757, filed Aug. 7, 1990, now U.S. Pat. No. 5,163,657.

BACKGROUND OF THE INVENTION

1. Field of Invention

The present invention relates to a method and apparatus for laying a communication wire such as an optical fiber (and including a communication unit which is a colligation of communication wires) into a tubular member or collecting a communication wire from the tubular member in which it has previously been inserted.

2. Description of Related Art

In the optical fiber art, there exists methods for using compressed fluids to lay in optical fiber, or the colligation of optical fibers, in a previously-placed tubular member (or tube). One such method is disclosed in Japanese Patent Unexamined Publication No. 59-104607.

FIG. 8 (Prior Art) illustrates the method and apparatus for laying a wire according to the prior art. According to this prior art, a communication wire 1 is supplied from a supply reel 2. Both the wire 1 and the supply reel 2 are under atmospheric pressure. The communication wire is to be inserted into a tubular member 5, which tubular member 5 has previously been disposed within a cable 4, by means of a pressure transfer head 3 (the tubular member 5 will be referred to as a previously-placed tubular member.) The pressure transfer head 3 is coupled with a compressor 6. The compressor 6 supplies the pressure transfer head 3 with a compressed fluid at a pressure somewhere above the atmospheric pressure. With this compressed fluid, the wire 1 is pressed and transferred into the previously-placed tubular member 5.

In order to accomplish the task of laying or collecting a communication wire utilizing the known apparatus and method, however, the following problems are encountered:

First, because the communication wire 1 enters the pressure head 3 at an entrance point which is under atmospheric pressure, the pressure fluid tends to leak from the pressure head 3 at that entrance, and further, because the fluid within the pressure head is under pressure, the entrance of the wire 1 into the pressure head 3 is resisted. Because this resistance impedes the transfer of the wire 1, and because the fluid leakage must be compensated for, the known methods and apparatus must be provided with a compressor having a large fluid delivery.

Second, in actual use of the known apparatus, the reel supply 2, the pressure transfer head 3, and the compressor 6 must all be transported directly to the wire laying site. The wiring laying site is frequently not easily reached, nor is it generally a convenient place to transport the above-mentioned equipment to. For example, the wire laying site may well be located inside a building or in a tunnel under a manhole. Accordingly, it is difficult to lay communication wire at such a site while still using the known apparatus and methods.

Third, utilizing the known methods in apparatus, adjustment of the wire transport speed is also difficult. In transferring the wire 1, the transfer speed must be adjusted wherever the previously-placed tubular member 5 bends or lifts (changes elevation). As previously mentioned, because the pressure head 3 generates a force which tends to resist the entrance of the wire 1, it is difficult to adjust the wire transfer speed utilizing the known methods and apparatus.

Finally, utilizing the known methods and apparatus, it is difficult to take-up the communication wire once it has been inserted into the previously-disposed tubular member such that it can readily be used again. This is because in using the known methods and apparatus, the communication wire is collected by being reversely fed at an irregular speed while being subject to constant vibration. This combination of irregular speed and constant vibration causes the quality of the communication wire thus removed to be seriously degraded.

SUMMARY OF THE INVENTION

Accordingly, one object of the present invention is to improve the working efficiency of laying and collecting communication wire by providing a method and apparatus which makes it possible to lay and collect communication wires in a way which advantageously eliminates the pressure force tending to resist the entrance of the wire to the pressure head. It should be understod that the methods and apparatus of the present invention are suitable for laying and collecting optical fiber communication wires.

Another object of the present invention is to provide a method and apparatus for laying and collecting a wire through which there is no need to transport a pressure transfer device such as a compressor down to the wire laying site.

The wire laying system being provided comprises: a previously-disposed first tubular member; a second tubular member having two ends thereof, one end being connected to the previously-disposed first tubular member; a communication wire disposed within said second tubular member; and a compressor means for supplying a fluid under pressure connected to a second end of the second tubular member whereby the fluid supplied by the compressor means serves to move the communication wire from the second tubular member to the first tubular member.

The wire collecting system being provided comprises: a first tubular member having two ends thereof; a communication wire disposed within the first tubular member; a second tubular member, adapted to receive the communication wire, connected to one end of the first tubular member; and a compressor means for supplying a fluid under pressure connected to a second end of the first tubular member whereby the fluid supplied by the compressor means serves to move the communication wire from the first tubular member to the second tubular member.

With such an arrangement, the apparatus for laying and collecting a communication wire to and from a previously-disposed tubular member is accomplished as the result of a pressure fit. As can be seen from the foregoing description, communication wire can be easily installed in places that would be difficult to reach while carrying a compressor, a pressure head, and a reel supply. This is because, in utilizing the apparatus and methods of the present invention, all heavy equipment such as the power source and the compressor can be located at any fixed point and only the communication wire and its carrier tube member need be carried to the insertion point.

Furthermore, in laying or collecting communication wire according to the methods and apparatus of the present invention, the problems associated with the known methods and apparatuses such as the fluid leakage from the pressure head entrance and the reverse pressure force resisting the communication wire's entrance into the pressure head can be avoided. Accordingly, the machines employed in the methods and apparatus of the present invention (including the compressor) may be considerably smaller than those employed by the known methods and apparatus. Further, with the present invention, the need to provide and transport a transfer head and a reel supply are eliminated. In all these respects, the working efficiency of laying and collecting communication wire is greatly improved.

Finally, because the wire to be laid or collected is transferred from one carrier member to another, the communication wire would always be contained within a carrier member. Accordingly, even if the weather is bad, or the working conditions poor, the communication wire can be collected or laid without being soiled by dirt or rain or other elements. This can be a significant advantage where the communication wire being laid or collected is an optical fiber whose performance depends in part on the condition of its exterior surface. To ensure the protection of the communication unit under these working conditions, it is preferable to apply a metal material to the carrier tube member being used.

Other objects, features and characteristics of the present invention, as well as the methods and operation and functions of the related elements of the structure and combination of parts and economies of manufacture, will become apparent upon consideration of the following description and appended claims with reference to the accompanying drawings, all of which form a part of this specification. Throughout the drawings, for simplicity, like reference symbols will be used for designating like or equivalent parts.

BRIEF DESCRIPTION OF THE DRAWINGS

FIGS. 1(a) and 1(b) are side views of the apparatus of the present invention arranged so as to lay or collect, respectively, a communication wire;

FIG. 2 is a side view of a typical communication cable having a bundle of previously-disposed tubular members;

FIG. 3 (Prior Art) is a cross-sectional view of a typical communication unit illustrating the colligation of communication wires;

FIGS. 4(a), 4(b) and 4(c) are sequential cross-sectional views of the apparatus of the present invention illustrating the transfer of an optical fiber communication unit from one communication cable to another;

DETAILED DESCRIPTION OF THE PREFERRED EMBODIMENT

Figure 5:
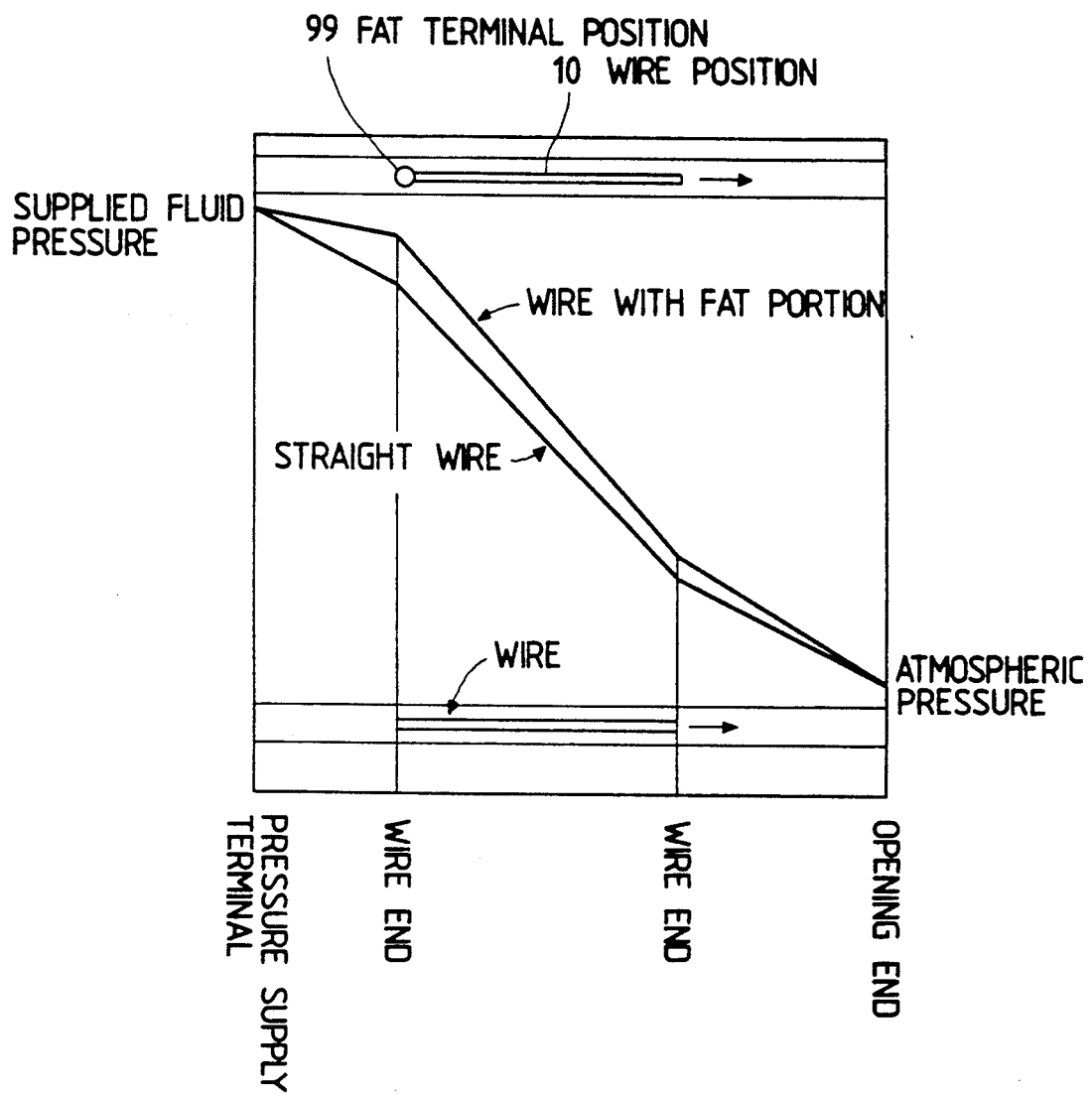
FIG. 5 is an explanatory diagram comparing fluid pressure forces acting on two different embodiments of the communication wire of the present invention.

A method and apparatus for laying and collecting a wire according to the present invention will be described with reference to the accompanying drawings. In the embodiments illustrated, a communication unit of a colligation of communication wires will be understood to refer to the communication wire being described and claimed. One example of a communication wire of the present invention is an optical fiber. Throughout the drawings, for simplicity, like reference symbols will be used for designating like or equivalent portions.

FIGS. 1(a) and 1(b) are explanatory diagrams which illustrate the methods and apparatus for laying and collecting, a communication unit. The method and apparatus for collecting a communication unit will be described with reference to FIG. 1(b). The method and apparatus for laying the communication unit will be described with reference to FIG. 1(a).

A bundle of previously-disposed tubular members 5 are disposed within a cable 4 (See FIG. 2). A communication unit 10 is to be inserted into the tubular member 5. As enlargedly illustrated in FIG. 3, the communication unit 10 is made up of a colligation of seven optical fiber wires 10(a), which colligation is covered and protected by a layer 10(b). As is best illustrated in FIGS. 1(a) and 1(b), one end of the tubular member 5 is coupled with the carrier tube member 7. This carrier tube member 7 is easily conveyable and therefore may be easily transported to, and coupled with, the previously-disposed tubular member 5. The carrier tube member 7 can be coiled for storage and transportation.

FIG. 1(b) illustrates the situation in which a communication unit disposed within the previously-disposed member 5 is to be collected. This previously-disposed tubular member 5 is illustrated in FIG. 1(b) as being coupled at an opposite end with a compressor 6. The compressor 6 feeds compressed fluid into the previously-disposed member 5, from this opposite end so as to transfer the communication unit 10 to the carrier tube member 7. When it is confirmed that the communication unit 10 has been transferred to the carrier tube member 7, the open end of the carrier tube member 7 is closed. Upon closing this open end, the transfer of the communication unit 10 stops, and the collecting operation of the communication unit 10 has been completed. Thus, using the apparatus and method of the present invention, the communication unit 10 is easily collected, and further, the communication unit thus collected can be easily wound within the carrier tube member 7, which is normally stored and conveyed in a coiled state, and can therefore be easily reused.

The method and apparatus for laying the communication unit 10 will be described with reference to FIG. 1(a). Consider the case in which the communication unit 10 is to be inserted into the previously-disposed tubular member 5. In this case, the communication unit 10 is inserted into the carrier tube member 7, such that it may later be transferred to the previously-disposed tubular member 5. The carrier tube member 7, as mentioned above, is typically stored and conveyed in a coiled state. An operator nips one end of the carrier tube member 7, and pulls out any desired length. The end of the carrier tube member pulled out is then coupled with a connector, and then connected (via the attached connector) to the previously-disposed tubular member 5. The other end of the carrier tube member 7 is then connected, by way of a second connector, to the compressor 6, which compressor 6 then feeds compressed fluid to that end. The fluid pressure causes the communication unit 10 to transfer from the carrier tube member 7 to the previously-disposed member 5. After it is confirmed that the communication unit 10 has been completely transferred into the previously-disposed tubular member 5, the open end of that previously-disposed tubular member 5 is closed. Then, the transfer of the communication unit 10 stops. When the transfer stops, the laying work of transferring the communication unit 10 to the previously-disposed member 5 is complete.

Thus, the communication unit 10 is transferred to the previously-disposed tubular member 5. Accordingly, the need to have auxiliary equipment, such as a pressure head or a reel supply (both of which are essential to the known methods and apparatus), is eliminated. This fact alone provides a remarkable reduction of work in terms of transporting, moving and controlling these auxiliary machines and results in a remarkable savings of labor. Further, since a pressure head is not used, the previously-disposed tubular member 5 within the cable 4 can be directly connected to the compressor 6. Accordingly, the instant embodiment successfully solves many of the problems arising from the use of a pressure head (including the insufficient pressure force for transfer, the large compressor requirement, the adjustment of the transfer speed and the pressure head entry leakage). It should be understood that the communication unit 10 may be a colligation of optical fiber communication wires.

In an alternative use, a communication unit 10 destined to be laid is previously inserted into a coiled carrier tube member 7. This coiled carrier tube member 7 containing the communication 10 is then transported to a job-site. The communication unit 10 can be pulled out of the tubular member 7 and stretched out with its (the communication unit's) end being coupled with the previously-disposed tubular member 5. Accordingly, the communication unit 10 may then be flexibly handled as common electrical cable is handled.

When encountering a location where wire-laying work is difficult, an engineer may unroll the coiled carrier tube member 7 to the extend necessary to reach the job site so as to avoid having to work in that location. Accordingly, the communication unit may be laid while the equipment (i.e.: the compressor and the portion of the tubular member 7 remaining coiled) are placed at a remote location. Because the uncoiled tubular member and the compressor can be placed at a remote location, the communication unit 10 is easily laid, even in those places which are difficult to work in utilizing the known methods and apparatus such as inside a building or in a tunnel under a manhole.

The method of collecting and laying a communication unit 10 utilizing the apparatus and method of the present invention will be described with reference to FIGS. 4(a), 4(b) and 4(c). These figures illustrate the collection of a communication wire from one previously-disposed member and insertion to another previously-disposed member.

As shown in FIG. 4(a), an optical fiber communication unit 10 is (previously) inserted into a couple of cables 8 and 9, which are connected at a point B. A compressor 6 is connected to the cable 8 at a point A. A transport/storage tube 11 is connected to cable 9 at a point C. To start, the compressor 6 is driven to feed compressed fluid into the cable 8, which causes the optical fiber communication unit 10 to transfer to the tube 11 (to collect the wire). Then, the cable 9 is disconnected from the cable 8 and reconnected to another cable 12. At the same time, the compressor 6 is disconnected from the cable 8 and connected to an open end (the right end as depicted) of the transport/storage tube 11 (See FIG. 4(b)). Then, the compressor 6 is driven to feed pressure fluid to the transport/storage tube 11, which causes the optical fiber communication unit 10 to transfer to the cable 12 (to transfer the wire). In this way, the optical fiber communication unit 10 can be transferred from the cable 8 to another cable 12 (See FIG. 4(c)).

Methods for laying and collecting a communication wire according to a further embodiment of the present invention will be described with reference to FIG. 5. The primary difference between the instant embodiment and the above-described embodiment is that a terminal portion of the communication unit 10, viz, the end closer to the compressor, the terminal end 99, has a thicker cross-sectional area than the remainder of the wire. The communication wire thus shaped may be readily formed by either a monolythic moulding or a terminal jig. According to this further embodiment, the thick end reduces the gap between the communication wire and the inner wall of the tubular member. Because of this, the pressure drop between the pressure supply terminal and the fat terminal of the wire is greatly reduced. Hence, the pressure drop along the remainder of the communication wire is greater and causes the transfer speed of the wire to increase. This information is depicted in graphic form in FIG. 5. The relationship between the inclination of the pressure drop and the transfer force in this situation is discussed by S. Hornung, et al. in their paper entitled "The Blown Fiber Cable" in IEEE Journal On Selected Areas In Communications, No. 5, of Vol. SAC-4, p. 679-685, August 1986. In the paper, a transferring force (f) is expressed by the following equation:

$$f = (\pi/4)(dP/dL)d1 \times d2, \ldots \quad (1)$$

Where d1 indicates an outer diameter of the optical fiber, and d2 an inner diameter of the tube path. As can be seen, the force (f) is proportional to the inclination of the pressure drop (dP/dL). In the case where the inner diameter of the carrier tube member is smaller than that of the previously-disposed tubular member, the pressure drop within the carrier tube member itself is relatively small. In this case, the pressure drop over the wire surface within the carrier tube member is greater than that when the inner diameters of both the tubular members are equal to each other. Accordingly, a greater transfer force can be obtained by providing a smaller inner diameter on the tubular member receiving the transfer of the communication unit, as can be seen from the equation (1).

Figure 6:
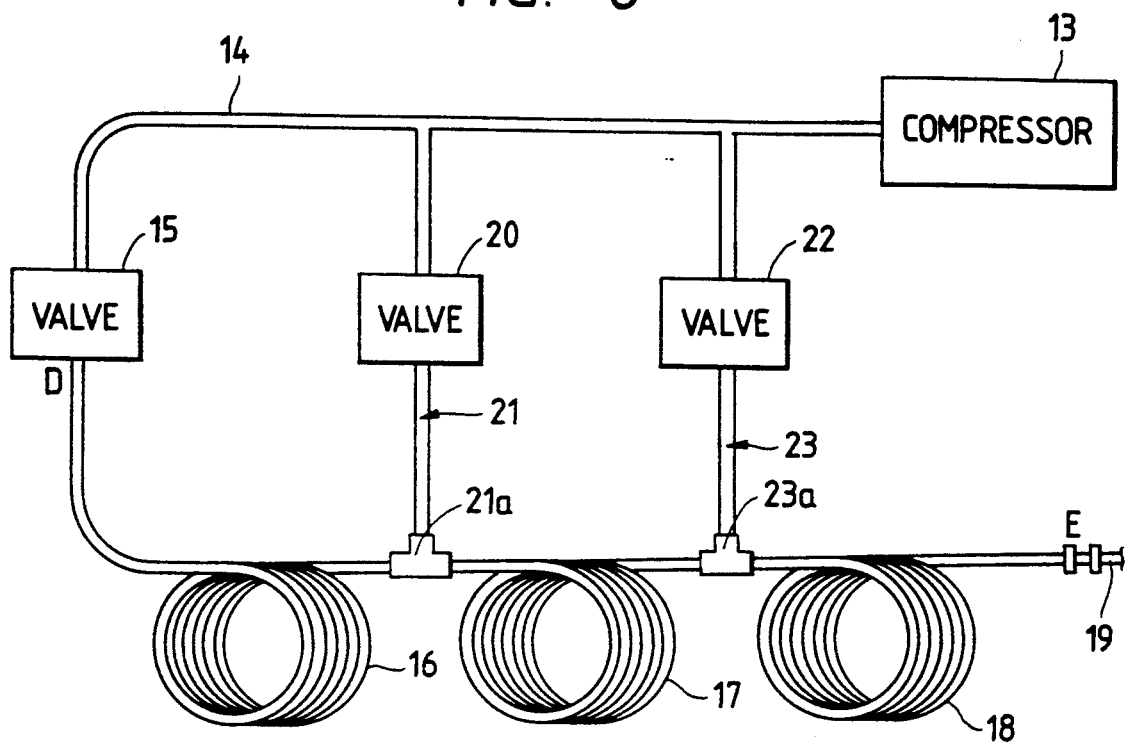
FIG. 6 is a system diagram of another embodiment of the present invention.
Figure 7:
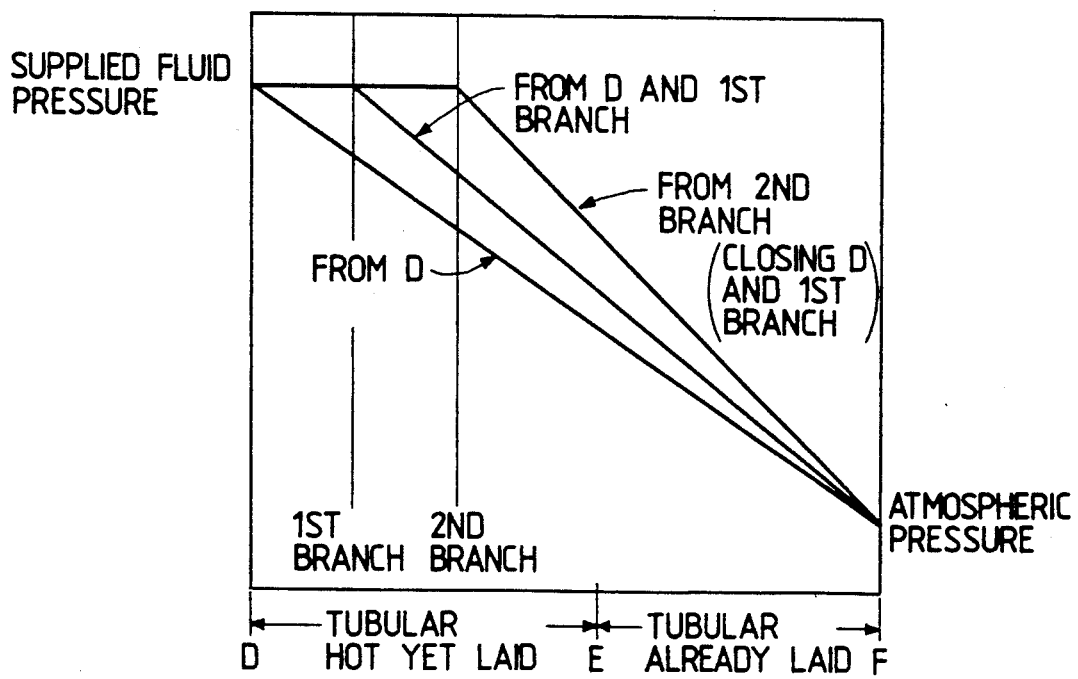
FIG. 7 is an explanatory diagram illustrating the fluid pressure forces acting on the communication wire and the embodiment of the apparatus illustrated in FIG. 6.
Figure 8:
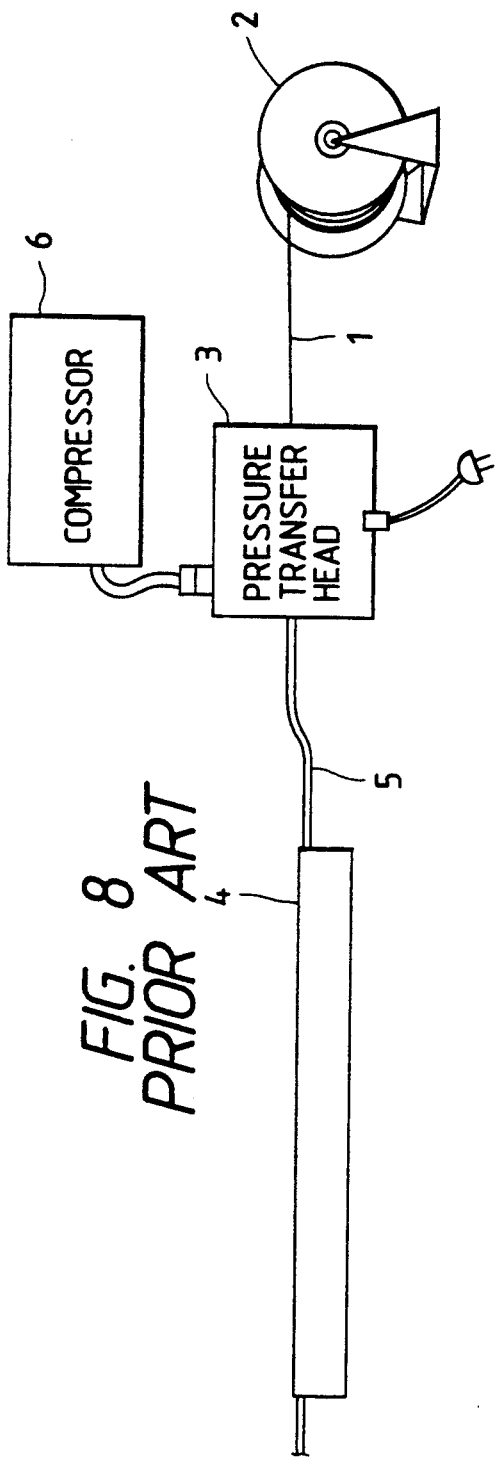
FIG. 8 (Prior Art) is a system diagram of an apparatus supplying the conventionally known methods.

An apparatus and a method of laying a wire according to additional embodiments of the present invention will be described with reference to FIG. 6. The major difference between the instant embodiment from those embodiments described above is that branch tubes, branching off from the carrier tube member, are provided such that compressed fluid can be fed from each of these branch tubes. FIG. 6 is a block diagram showing a wiring laying apparatus according to the instant embodiment. FIG. 7 graphically illustrates the pressure distribution within the tubular members (both the carrier tube member and the previously-disposed tubular member). A first carrier tube member 16, located downstream of a main tube 14, is connected at one end to the main tube 14, through a valve 15. The main tube 14 is connected to the compressor 13. The other end of the first carrier tube member 16 is connected to one end of a second carrier tube member 17. The other end of the second carrier tube member 17 is connected to one end of a third carrier tube member 18. The other end of the third carrier tube member 18 is connected to a previously-disposed tubular member 19. A branch tube 21 located between the first and second carrier tube members 16 and 17, is connected through a valve 20 to the main tube 14. A branch tube 23, located between the second and third carrier tube member 17 and 18, is connected through a valve 22 to the main tube 14.

In the instant wire laying apparatus, with the supply of compressed fluid from first and second branch points 21(a) and 23(a), the pressure can be uniformly distributed between the pressure supply and the branch portions, and hence the pressure drop beyond each of the branch portions can be increased. This result is depicted in graphic form in FIG. 7. Accordingly, in inserting a wire into the carrier tube members, if, after the terminal of the wire passes the branch portions 21(a) and 23(a), the pressure fluid is supplied from the branch portions 21 and 23, the pressure drop over the communication wire's length is increased, and results in an increase in the pressure transfer force. As a direct result of this increase, a higher transfer speed may be obtained.

The wire laying methods and apparatuses thus arranged were tested, and the results of these tests will now be described.

In a first test, both the conventional wire laying method and the wiring laying method according to the present invention were operated. The results of the first test will be comparatively described. Seven tubular members with an inner diameter 6 mm were disposed in the cable 250 m long (See FIGS. 2 and 3). Seven optical fibers were colligated into a communication unit of 2 mm in outer diameter. The communication unit was then transferred to the cable through a conventionally known transfer head. In completing the transfer of the communication unit, 7 minutes were taken using compressed air at 4 kg/cm$^2$. The amount of the compressed air discharged by the compressor during this transfer was 130 l/min.

Utilizing the wire laying method according to the present invention, a 270 m long unit communication unit was inserted into a 300 m long carrier tube member having a 6 mm inner diameter. This insertion was achieved by using a compressor with a sufficient quantity of flow. The carrier tube member was then connected at one end to a previously-disposed tubular member within a cable 250 m long. The other end of the carrier tube member was then connected to the compressor. Utilizing the compressed air pressure of 4 kg/cm$^2$ (measured at the connection point between the tubular members), it took 6 minutes and 50 seconds to lay the wire. The amount of air discharged from the compressor was 70 l/minute. The test was conducted with the carrier tube member being left in an extended (not coiled) state.

A second test using a carrier tube member with an inner diameter smaller than that of the previously-disposed tubular member will now be described. In this test, the length and inner diameter of the carrier tube member was 300 m and 4 mm, respectively. The length and inner diameter in the previously-disposed tubular member was 250 m and 6 mm, respectively. The length and outer diameter of the communication unit was 270 m and 2 mm, respectively. The communication unit was then inserted into the previously-disposed tubular member. Compressor air at 4 kg/cm$^2$ was supplied from one end of the previously-disposed tube member. The time taken for laying the wire was 6 minutes and 30 seconds. This figure illustrates that reducing the inner diameter of the tube member receiving the communication unit below that of the tube member transferring the communication increases the transfer force and reduces the transfer time.

A third test was carried out in which branch tubes, branching off from the carrier tube, were utilized. In this test, a branch tube was coupled with the carrier tube member at a position 200 m distant from the connection point between the carrier tube member and the previously-disposed tubular member. A 270 m long communication unit was laid in a previously-disposed tubular member, 250 m long. The pressure of the compressed air was 4 kg/cm$^2$ (measured at the end of the carrier tube member). To begin the transfer of the communication unit, compressed air was supplied from the end of the carrier tube member. After the communication unit passed the position at which the branch tube was mounted, the end of the carrier tube member was closed, and the compressed air was then supplied through the branch tube. It took only 6 minutes and 20 seconds to lay the wire utilizing this arrangement. As can easily be understood, by referring to FIG. 7, by utilizing a branch network, the time necessary to transfer the communication unit was further reduced.

A fourth test featured a tubular terminal member mounted on the terminal of a communication unit (the terminal member is the thicker end at the terminal position referred to in connection with FIG. 5). In this experiment, seven 270 m long optical fibers were colligated into a communication unit having an outer diameter of 2 mm. A tubular terminal member 4 mm long and 3.5 mm in diameter was mounted on the terminal portion of the communication unit. The communication unit was then inserted into a 300 m long carrier tube member, as described above. This carrier tube member was then connected to a 250 m long previously-disposed tubular member. Compressed air at a pressure of 4 kg/cm$^2$ was supplied from the other end of the carrier tube member. The wire laying time was 6 minutes and 10 seconds, which time illustrates that the transfer force may be increased by reducing the gap between the communication unit and the tubular members at the terminal end of the communication unit. This increased transfer force translates into a shorter transfer time.

In conventionally-known wire collecting methods, the first step in transferring a communication wire would be to remove the pressure head. Following this, the wire would be taken up by a supply reel. By doing so, the communication unit would be reversely transferred from a tubular member to the supply reel. It is noteworthy to mention that in collecting the communication unit in this manner, the transfer speed of the communication unit was unstable (i.e., it was transferred intermittently at higher or lower speeds) and during the course of the transfer, the communication unit was subject to vibration while under tension. Furthermore, it was difficult to control the take-up speed of the reel.

Utilizing the apparatus and method of the present invention, however, a communication unit can be transferred to a carrier tube member for transfer/storage in 4 minutes and 40 seconds. After confirming the completion of the wire transfer, the open end (the end not connected to the previously-disposed tubular member) of the carrier tube member was closed. The transfer of the communication unit was then stopped. The communication unit thus collected is easily reused and can be laid by the wire laying method of the present invention.

In the situation in which a communication unit 10 is to be transferred from one previously-disposed tubular member to a second previously-disposed tubular member (shown in FIGS. 4(a), 4(b) and 4(c)), a communication unit of 150 m, which was laid over a distance of 200 m between points A and C, was collected into the transfer/storage tube 11. The communication unit 10 was then connected to another previously-disposed tubular member at point B and was laid between points C and D. In so doing, no poorly wound communication units 10 were found. Furthermore, the entire connection change was completed within 20 minutes.

At the stage of actual production, a compressor of large capacity is installed in the factory. With this compressor, a communication unit of desired length may be inserted into a carrier tube member at the factory. The carrier tube member contained in the communication cable is easily transported to a job-site. At the job-site, the communication unit may be laid according to the present invention. In this way, the characteristics of the pressure transfer of each unit can be checked prior to beginning work on laying the communication wire.

It should be understood that the present invention is not limited to the embodiments as mentioned above, but, may be variously modified and changed within the scope of the invention. For example, a plurality of communication units as connected may be used for a communication unit as referred to in the above-mentioned embodiments. The length, structure, shape and the like of the cable, tubular member, and communication wire may be appropriately changed. Accordingly, a communication unit much longer than the cable it is to be laid into may be inserted into a carrier tube member, then laid in a single tubular member and cut off at a desired length.

A new communication unit may also be inserted into a previously-disposed tubular member, while simultaneously removing the old communication unit previously inserted. In this case, the new and old communication units may be connected together or separate from each other. While the communication units referred to in the above-mentioned embodiments are generally comprised of a colligation of communication wires, it is also within the scope of the invention that single wires serving as optical fibers may be inserted individually. It should be understood that the methods according to the present invention are applicable to such an individual insertion.

It should also be understood that the laying and collecting of only a part of a communication unit or a communication wire (See FIGS. 4(c), 4(b) and 4(c)) should be considered within the scope of the present invention.

In light of the transfer force characteristics noted above, in laying communication wire, it is preferable that the diameter of the carrier tube member be slightly larger than that of the previously-disposed tubular member. For the same reasons, in collecting a wire, it is preferable that the carrier tube member (the receiving tube in this situation) have a slightly smaller inner diameter than that of the previously-disposed tubular member.

As can be seen from the foregoing description, according to the present invention, the wire laying or collecting work can be readily done without the necessity of carrying a pressure head transfer device or a compressor directly to a job-site. Furthermore, given the transfer characteristics of the apparatus of the present invention, a relatively small compressor may be used in laying and collecting a communication wire while at the same time minimizing the flow rate required to later collect that wire.

What is claimed is:

1. A wire laying method comprising the steps of:
    selecting a previously disposed first carrier member for routing a communication wire;
    inserting all of the communication wire to be disposed in said first carrier member into a second carrier member;
    coupling one end of the second carrier member to the first carrier member;
    coupling a second end of the second carrier member to a compressor means for supplying a fluid; and
    supplying a fluid to the second carrier member whereby the fluid supplied serves to move the communication wire from the second carrier member to the previously disposed first carrier member.

2. A wire collecting method comprising the steps of:
    selecting a communication wire for collection, the selected communication wire being routed through a previously disposed first carrier member;
    coupling a second carrier member to one end of the first carrier member;
    coupling another end of the first carrier member to a compressor means for supplying a fluid; and
    supplying a fluid to the first carrier member whereby the fluid supplied serves to move the communication wire from the previously disposed first carrier member to the second carrier member.

3. A wire laying method for inserting a communication wire into a previously disposed first tubular member disposed within a cable as previously laid, the wire laying method comprising the steps of:
    inserting all of the communication wire to be disposed in said first tubular member into a second tubular member which is adapted to couple with the previously disposed first tubular member; and
    coupling one end of the second tubular member with the previously disposed first member;
    feeding compressed fluid from a second end of the second tubular member, thereby causing the communication wire to transfer from the second tubular member to the previously disposed first tubular member.

4. A wire collecting method for removing a communication wire from a previously disposed first tubular member disposed within a cable as previously laid, the wire collecting method comprising the steps of:
    coupling a second tubular member to one end of the previously disposed first tubular member; and
    feeding compressed fluid from a second end of the previously disposed first member to the second tubular member, thereby causing the communication wire to transfer from the previously disposed first tubular member to the second tubular member.

* * * * *